United States Patent Office 3,482,983
Patented Dec. 9, 1969

3,482,983
PROCESS FOR HARDENING PHOTOGRAPHIC
LAYERS
Friedrich Bauriedel, Dreieichenhain, Germany, assignor
to E. I. du Pont de Nemours and Company, Wilmington, Del., a corporation of Delaware
No Drawing. Filed Nov. 23, 1966, Ser. No. 596,472
Claims priority, application Germany, Dec. 30, 1965,
A 51,211
Int. Cl. G03c 1/30
U.S. Cl. 96—111                                    4 Claims

ABSTRACT OF THE DISCLOSURE

Gelatin-containing layers are hardened by means of compounds of the formula:

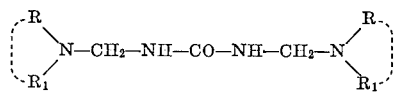

and

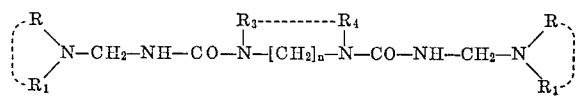

wherein
R and $R_1$=alkyl, aralkyl, allyl or represent in the form

a bridge containing 4 or 5 methylene groups,
$R_3$ and $R_4$=H or represent in the form $R_3$—$R_4$ a methylene group bridge, wherein $R_3$ and $R_4$ are each a methylene group, and
$n=2$–$6$, if $R_3$ and $R_4$=H, and 2, when $R_3$ and $R_4$ are present in the form of a methylene group bridge.

Gelatino-silver halide layers, protective layers, filter layers, intermediate layers, and backing layers of photographic films can be hardened with the compounds. Effective hardening is rapid and lesser drying times are attained by use of the compounds.

---

This invention relates to processes for hardening gelatin-containing photographic layers, particularly silver halide emulsion layers.

It is known that the mechanical strength of gelatin-containing photographic layers can be improved by adding to these layers hardening agents during their production. These agents react chemically with the gelatin to form crosslinks between the individual polypeptide chains and effect, due to the crosslinking reaction, an increase in the melting point, while simultaneously the water absorption and swelling characteristics, respectively, of the gelatin are reduced. Gelatin-containing layers treated in this manner have an improved resistance toward mechanical stresses and during processing are resistant to the treating bath. Unhardened layers, on the other hand, swell in these baths very strongly and are in this state extremely sensitive to mechanical damage.

The substances generally used as gelatin hardening agents are aliphatic and aromatic aldehydes, particularly Formalin, as well as addition products of formaldehyde to acid amides, such as, for example, methylol and dimethylol urea. Other useful agents are acid chlorides, acid anhydrides and compounds with at least two ethyleneamine rings in the molecule, as are derived from bis ureas or as are used in the form of carboxylic acid ethyleneimine, sulfonic acid ethyleneimine, or phosphoric acid ethyleneimine.

However, the hardening agents which have become known so far do not comply in all points with the numerous requirements, which must be made of a hardening agent for modern light-sensitive layers.

Thus, the aldehydes and the methylol compounds act only very slowly, so that a considerable storage time is required, until the optimum hardening effect is reached. Thereby, naturally, the entire hardening process becomes quite uncontrollable, and reactions occur which often involve a deterioration of the sensitometric properties of the light-sensitive material.

Other hardening agents, for example acid anhydrides acid chlorides, change in undesired manner the pH value of the layer during the hardening process.

Another important requirement for a good hardening agent with regard to machine processing of photographic layers is that it result in a gelatin having a high melting point, and also that it effectively shorten the drying time for the layer, without impairing the sensitometric values. It is known that photographic layers can be dried more rapidly the more they are hardened. It is also known that very strongly hardened layers show reduced permeability for the processing bath, which must result in sensitivity and gradation losses in the finished layer.

In accordance with this invention, it has been found that compounds of the general formula:

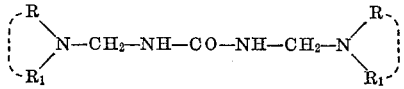

and

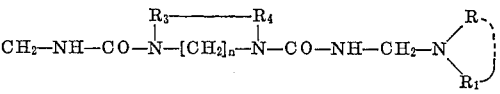

wherein
R and $R_1$=alkyl, aralkyl, allyl or represent in the form

a bridge containing 4 or 5 methylene groups,
$R_3$ and $R_4$=H or represent in the form $R_3$—$R_4$ a methylene group bridge, wherein $R_3$ and $R_4$ are each a methylene group, and
$n=2$–$6$, if $R_3$ and $R_4$=H, and 2, when $R_3$ and $R_4$ are present in the form of a methylene group bridge, as well as their salts with inorganic and organic acids, e.g., as hydrochlorides, sulfates, acetates, etc. exert an excellent hardening effect on photographic layers, which contain gelatin as a binder, without the above-mentioned disadvantages of known hardening agents.

In the foregoing formulae, the alkyl radicals may contain 1 to 18 carbon atoms and suitable radicals include methyl, ethyl, isopropyl, butyl, n-octyl, dodecyl and octadecyl. Suitable aralkyl radicals include benzyl and me-naphthyl radicals.

The compounds used according to the invention have the advantage that they effect at normal or moderate hardening (i.e., not too high melting points) a very significant shortening of the drying time of the gelatin-containing layer treated.

The photographic layers hardened by utilizing the mentioned compounds show no reduced permeability to the treating solutions, so that during processing the optimum sensitometric values can be reached.

In this property, the hardening agents, according to the invention, are superior to the known comparable hardening agents, particularly the ethyleneimine compounds with at least two ethyleneimine rings in the molecule. With the aid of the compounds according to the invention and without any retardation, the final state of hardening is very rapidly reached, so that within a few days after the initial treatment no further hardening takes place and the sensitometric properties do not change. This makes possible an early evaluation of the quality of the hardened gelatin-containing layer.

The hardening agents used in accordance with the invention are quite soluble in water and therefore can be admixed with the photographic emulsion without using organic solvents, which may have adverse effects. They are, moreover, without any effect on the viscosity of the coating solutions and require no additional measures or changes of the usual coating conditions. The hardening agents used in accordance with the present invention are suitable not only for hardening photographic gelatin-containing emulsion layers, but also for hardening gelatin-containing protective layers, filter layers, intermediate layers or backing layers and the like.

The amount of hardening agents according to the invention to be used depends on the desired effect and can be determined and varied from case to case readily by correspondingly small preliminary experiments. For hardening gelatin-containing silver halide emulsion layers, effective hardening amounts are used which are normally amounts from about 0.2 to about 1.0 percent by weight based on the dry weight of gelatin. However, a hardening effect can be attained when lower concentrations are used, whereas utilization of considerably higher concentrations is without any sensitometric disadvantages.

The hardening agents are added to the photographic gelatin-containing coating compositions in the form of their aqueous solutions. However, it is also possible to treat the finished photographic layer subsequently with an aqueous solution of said agents.

Another important advantage of the hardening agents of the invention consists in their inexpensive and simple mode of preparation from inexpensive and available starting materials. No special protective measures, as for example in the production of ethyleneimine compounds, are required. The ω-ω'-bisdialkylaminomethyl compounds used as hardening agents may be prepared, for example, in simple manner from urea or ω,ω'-bis-ureas and Formalin as well as possibly substituted secondary amines, such as diethylamine, dipropylamine, piperidine, piperazine, morpholine, diallylamine, etc.:

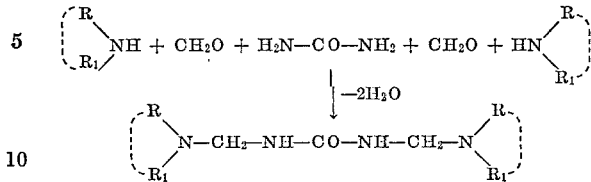

Suitable compounds for carrying out the process according to the invention are, among others, the following:

Compound I: ω,ω'-bis-diallylaminomethyl urea

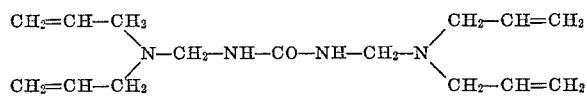

Compound II: ω,ω'-bispiperidinomethyl urea

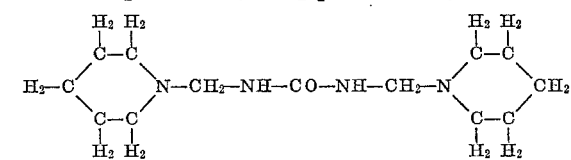

Compound III: ω,ω'-bispiperidinomethyl urea-dihydrochloride

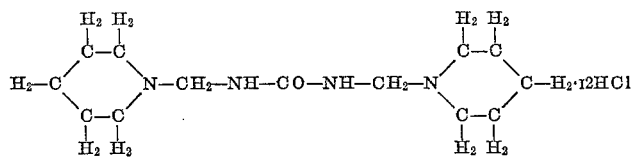

Compound IV: ω,ω'-bis-N-methyl-N-octadecylaminomethyl urea

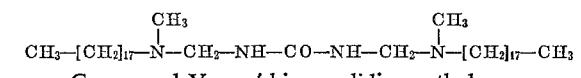

Compound V: ω,ω'-bispyrrolidinomethyl urea

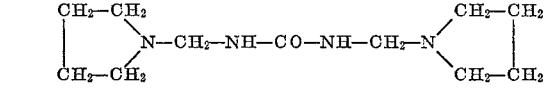

Compound VI: ω,ω'-bispiperidinomethyl-hexamethylene diurea

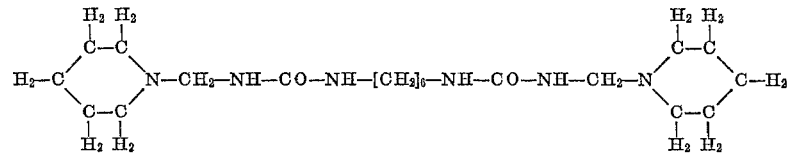

Compound VII: ω-ω'-bispiperidinomethyl-piperazine diurea

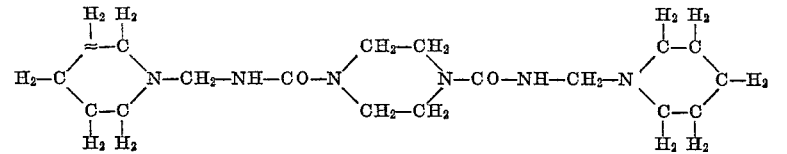

Compound VIII: ω,ω'-bis-N-methylpiperazinomethyl urea

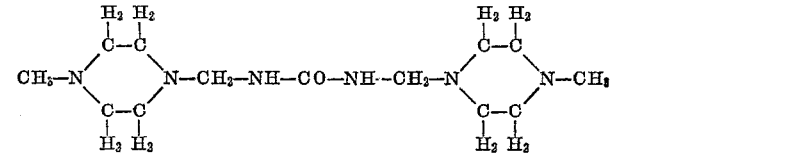

Preparation of the aforementioned compounds can be effected in detail in the manner not claimed here, for example, as follows:

Compound II, bispiperidinomethyl urea

Preparation of this compound can take place according to the data of A. Einhorn, Ann. 361, p. 139 (1908).

The hardening compounds I, III, IV, V and VIII prepared from urea, Formalin and secondary amines and listed in the summary can be prepared in an analogous manner.

Compound VI, ω,ω'-bispiperidinomethyl-hexamethylene diureau

Step I: Hexamethylene diurea.—An intimate mixture from 115 g. hexamethylenediamine-1,6 (1 mol) and 180 g. urea (3 mols) is heated for 3 to 4 hours to 130–140° C. The mixture becomes liquid after about 30 minutes, while the ammonia escapes in gaseous form. At the end of the reaction time, the ammonia evolution diminishes and the mixture becomes solid again. On cooling, the reaction product is recrystallized from 2.5 liters of water. Yield 170 g., melting point 196° C.

Step II: ω,ω'-bispiperidinomethyl-hexamethylene diurea.—49.5 hexamethylene diurea is suspended in 300 ml. of water. 49.5 ml. piperidine and 38 g. of 40% Formalin are added, slight heating taking place. While shaking repeatedly the mixture is heated for 15 min. on the steam bath. After cooling, the resulting reaction product is separated, washed and dried in the desiccator. After recrystallization from methanol, 24.5 g. of colorless crystals of M.P. 172° C. is obtained.

The following examples will illustrate the invention more in detail, however, without limiting it in any manner.

Example 1

To 1 kg. of a highly sensitive, coatable silver iodobromide emulsion, which contains about 6% of gelatin and 8.2% of silver halide, which consists of 98.8% bromide and 1.2% iodide, 0.15%, 0.50% and 0.75% of the compound of Structure I, based on dry gelatin, are added in the form of aqueous solutions, and thereupon the pH value adjusted to 6.8. By this addition, the viscosity of the emulsions ready for coating does not change.

The emulsions were cast on a conventional polyester base and provided with a gelatin-containing protective coating, which was hardened in the same manner as the emulsion layer.

After 7 days, the hardened material showed in the melting-point and drying-time determination carried out in the usual manner the following values:

| | Added amount of hardening agent, based on dry gelatin | | |
|---|---|---|---|
| | 0.15% | 0.50% | 0.75% |
| Melting point, ° C | 88 | Above 100 [1] | Above 100 [1] |
| Drying time of the developed, fixed and rinsed materials (in seconds) | 70 | 65 | 4 |

[1] Resistant to boiling.

In a similar manner, satisfactory hardening with a melting point of about 90° C. was obtained in photographic layers with the addition of 0.15% by weight of the compound of Structure II based on gelatin. Swelling was reduced markedly and good resistance to handling was obtained.

Example 2

This example shows that the viscosities of the photographic silver halide emulsions ready for coating on addition of the hardening agents according to the invention are not changed over a period of time of many hours. For this purpose, the casting solutions adjusted to the pH values of 6.0, 6.5 and 7.0 were each mixed with 1% of the hardener of structural Formula II, based on dry gelatin, stirred at 35° C. and the resulting efflux times measured as measure for the viscosities in seconds.

DIGESTION TIMES.—HOURS (h.)

| | 0.5 h. | 1 h. | 2 h. | 4 h. | 6 h. | 8 h. |
|---|---|---|---|---|---|---|
| pH 6.0 | 10.9 | 11.0 | 11.0 | 11.1 | 11.1 | 11.1 |
| pH 6.5 | 10.9 | 10.9 | 11.0 | 11.1 | 11.1 | 11.1 |
| pH 7.0 | 11.5 | 11.5 | 11.5 | 11.5 | 11.5 | 11.5 |

Example 3

A highly sensitive silver iodobromide emusion, which contains about 6% of gelatin and 8.2% of silver halide, which consists of 98.8% bromide and 1.2% iodide, is divided in three portions and each portion mixed with 2 millimoles/kg. of emulsion of the hardening agents from their aqueous solutions.

(a) Compound of structure II (bispiperidinomethyl urea).

(b) Compound of the structure VII, ω,ω'-bispiperidinomethyl-piperazine diurea.

(c) A compound from the group of the ω,ω'-bisaziridinyl compounds, as described in German patent application J 72,895.

After coating, the emulsion layers are coated with a gelatin layer to which 1 kg. half of the amount of hardening agent used in the emulsion, is added.

After a storage time of a few weeks, layers almost stable on boiling are obtained. These layers, which practically do not differ in their melting points, however, show considerable differences in their drying times after the treatment with photographic baths:

Layer (a) melting point 98° C., drying time 175 sec.
Layer (b) melting point 91° C., drying time 225 sec.
Layer (c) melting point above 100° C., drying time 230 sec.

Sensitometric evaluation of the samples indicated layer (a) to have superior sensitivity and low fog, while the sensitivity and fog values for layer (b) were satisfactory.

Example 4

This example shows that also with a hardening adjusted to relatively low melting points better drying times are obtained:

A highly sensitive silver iodobromide emulsion, which contains about 6% of gelatin and 8.2% of silver halide, which consists of 98.8% of bromide and 1.2% of iodide, is divided in three portions and each of which is mixed with a hardening agent mentioned below in an amount of 1.2 millimoles/kg. of emulsion.

(a) Compound of structure II (bispiperidinomethyl urea).

(b) A compound from the group ω,ω'-bisaziridinyl compounds, as described in German patent application J 72,895.

(c) Formalin.

The emulsions provided with the hardening agent were coated on a usual triacetate base and provided with a coating-protective layer, which contained per kg. of castable coating each time half of the amount of hardening agent contained in the emulsion.

After a short storage time the thus hardened layers hardly differed in their melting points, but did differ in their drying times:

Layer with hardener (a): M.P. 46° C.; drying time 150 sec.

Layer with hardener (b): M.P. 48° C.; drying time 225 sec.

Layer with hardener (c): M.P. 45° C.; drying time 225 sec.

Sensitometric evaluation does not disclose in the compound according to the invention II of example (a) any sensitometric disadvantages in comparison with the layers hardened with the conventional hardening agents (b) and (c).

Example 5

This example shows that by application of the hardening agent according to the invention exclusively in a protective layer, which had been cast on an emulsion layer without addition of hardening agent, advantageous hardening is possible:

A highly sensitive silver iodobromide emulsion, which contains about 5.5% gelatin and 8.2% silver halide, which consists of 98.8% bromide and 1.2% iodide, is divided in four portions. Portions 1 and 2 are each mixed with 0.4 g. of a hardening agent, which had been dissolved in water for addition:

Portion 1: 0.4 g. of bispiperidinomethyl urea (hardener of structure II).
Portion 2: a compound from the group of the ω,ω'-bis-aziridinyl compounds, as described in German patent application J 72,895;

whereas the emulsion portions 3 and 4 remained without addition of hardener. Emulsion portions 1 and 2 provided with the hardening agents are provided after coating with a gelatin containing protective coating, which per kg. contains 0.05 g. of the hardening agent used in the emulsions.

Emulsion portions 3 and 4, which have remained without hardening agent, are provided after coating with the same coating as was used in portions 1 and 2. However, in this case the coating of portion 3 contained the entire amount of hardener of 0.45 g. used in portion 1. The coating of portion 4 was mixed for control, as is customary in the industry, with 0.3 ml. of 30% Formalin per kg., as hardening agent.

After a few days, the layers coated in this manner showed nearly the same melting points, however considerable differences in the drying times after the customary processing in photographic baths:

| Portion | 1 | 2 | 3 | 4 |
|---|---|---|---|---|
| Melting points, °C | 51 | 53 | 55 | 43 |
| Drying times, sec | 140 | 190 | 130 | 160 |

The sensitometric values for sensitivity and fog were best for the layers coated from portion 3, which contained the hardener according to the invention of structure II only in the protective coating.

The embodiments of the invention in which an exclusive property or privilege is claimed are defined as follows:

1. Process for hardening gelatin-containing layers of photographic elements, characterized in that in some stage of their formation there is admixed with the gelatin effective hardening amounts of compounds of the general formula:

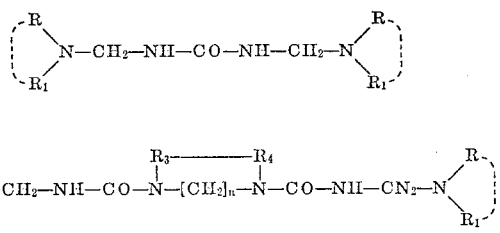

and $$\overset{R}{\underset{R_1}{\diagdown}}N-CH_2-NH-CO-N-[CH_2]_n-N-CO-NH-CH_2-N\overset{R}{\underset{R_1}{\diagup}}$$
$$\phantom{xxxxxxxxxxxxxxxxxx}R_3\phantom{xxx}R_4$$

wherein

R and $R_1$=alkyl, aralkyl, allyl or represent in the form $$\overset{R-R_1}{|\quad|}$$

a bridge containing 4 or 5 methylene groups, $R_3$ and $R_4$=H or represent in the form $R_3$—$R_4$ a methylene group bridge, wherein $R_3$ and $R_4$ are each a methylene group, and $n$=2–6, if $R_3$ and $R_4$=H, and 2, when $R_3$ and $R_4$ are present in the form of a methylene group bridge.

2. A process according to claim 1 characterized in that the compounds are added to the gelatin-containing material for photographic elements before coating the material onto a surface from an aqueous solution or dispersion.

3. A process according to claim 1 characterized in that the compounds are admixed with a gelatin-containing, silver halide layer.

4. A process according to claim 1 characterized in that one of the compounds is admixed in amounts of about 0.2% to about 1.0% based on the dry weight of the gelatin.

References Cited
UNITED STATES PATENTS

| | | | |
|---|---|---|---|
| 2,354,662 | 8/1944 | Bryce | 96—111 XR |
| 2,493,838 | 1/1950 | Terry | 96—111 XR |
| 3,305,376 | 2/1967 | Burness et al. | 96—111 XR |

NORMAN G. TORCHIN, Primary Examiner

RICHARD E. FICHTER, Assistant Examiner